Oct. 19, 1954 — C. S. MACAULAY — 2,691,783
BED ATTACHMENT FOR AUTOMOBILES
Filed Sept. 9, 1949 — 2 Sheets-Sheet 1

Inventor
Charles S. Macaulay
By:—
agent

Oct. 19, 1954
C. S. MACAULAY
2,691,783
BED ATTACHMENT FOR AUTOMOBILES
Filed Sept. 9, 1949
2 Sheets-Sheet 2
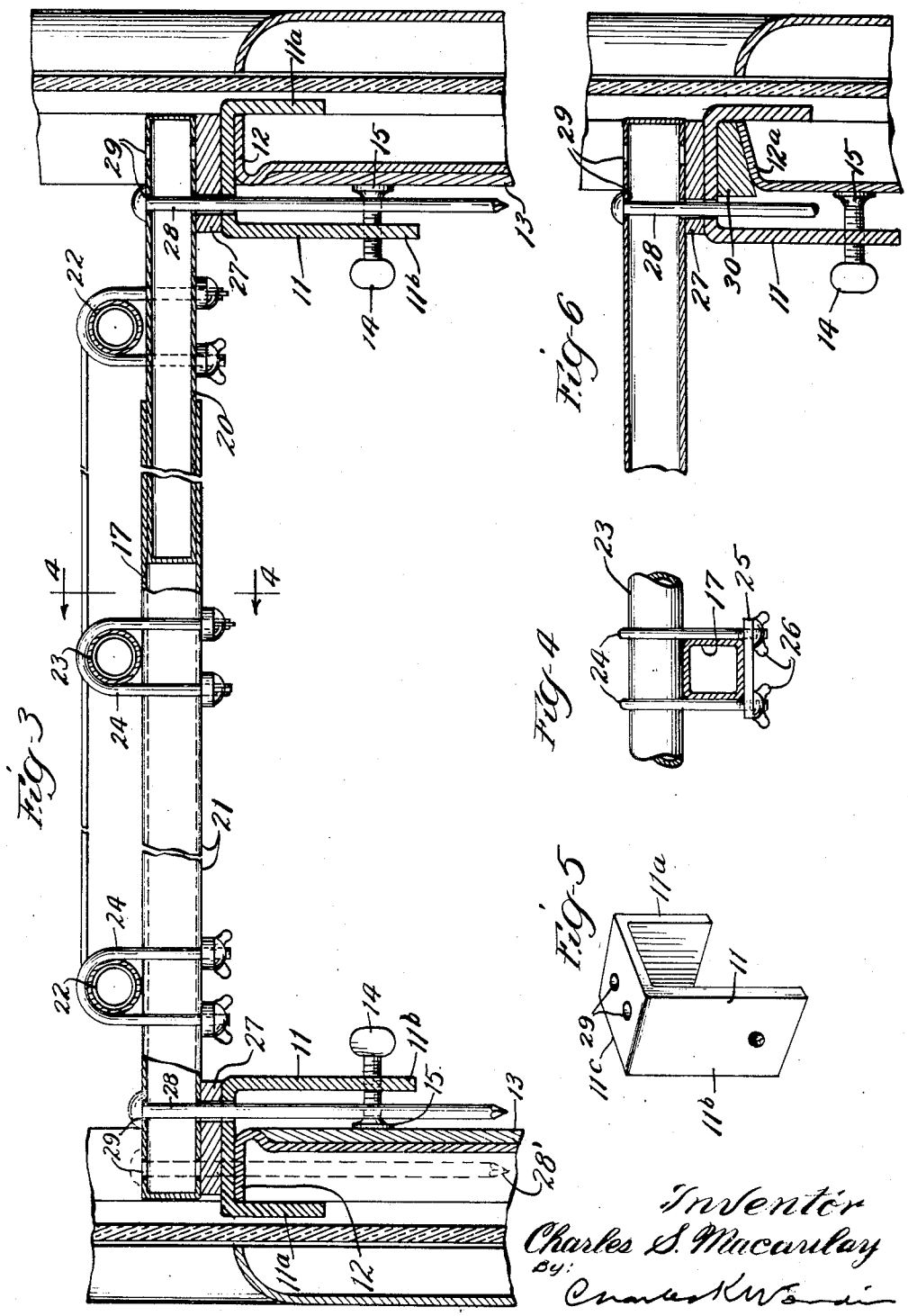

Patented Oct. 19, 1954

2,691,783

UNITED STATES PATENT OFFICE 2,691,783

BED ATTACHMENT FOR AUTOMOBILES

Charles S. Macaulay, Chicago, Ill.

Application September 9, 1949, Serial No. 114,728

4 Claims. (Cl. 5—118)

This invention relates to bed frames for automobiles and concerns itself with a platform-like structure that can be quickly assembled or disassembled together with means for sustaining the same in the modern car above the seats thereof.

It is an object of this invention to provide an improved bed platform that is susceptible of being supported from the window sills of cars.

It is a further object of this invention to provide novel anchoring means in connection with the window sills of cars for sustaining the bed platform.

With these and other objects in view which will become apparent as the description proceeds, this invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 3 is a fragmentary transverse sectional view of a car frame upon an enlarged scale;

Fig. 4 is a detail section taken upon the line 4—4 of Fig. 3 looking in the direction of the arrows;

Fig. 5 is a perspective view of a support associated with the frame of the car; and Fig. 6 is a fragmentary sectional view of a modified connection between the support and car frame.

Figure 1:
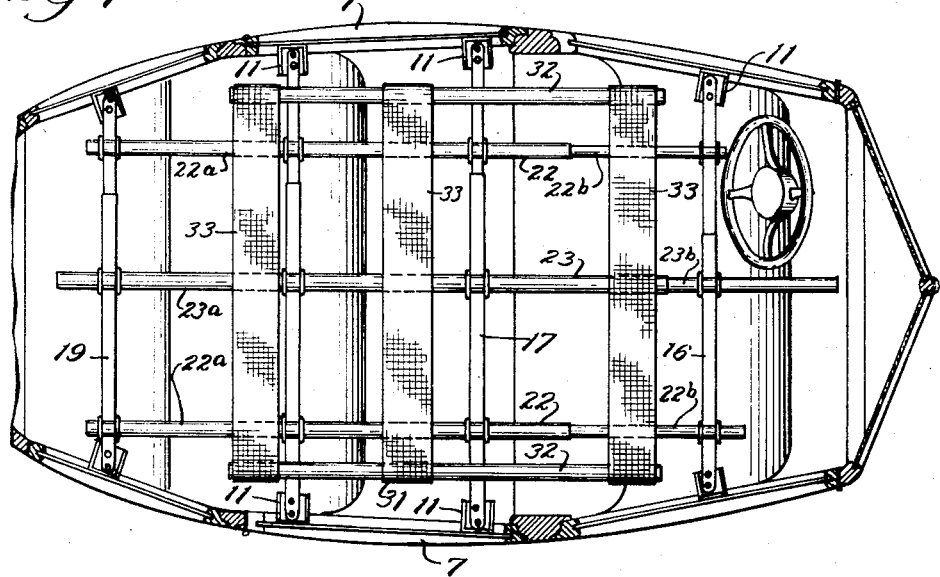
Fig. 1 is a top plan view of a bed platform positioned in an automobile with the top of the car removed.
Figure 2:
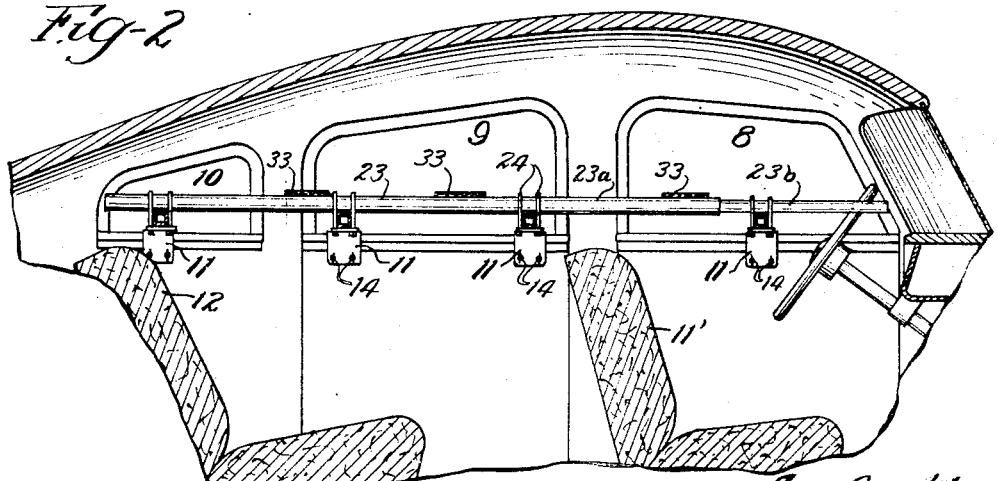
Fig. 2 is a vertical fragmentary longitudinal sectional view with the bed platform in position.

In referring now to the drawing, there is shown an automobile having side walls 7 which may be of modern or any other shape and which are equipped with windows 8, 9 and 10, the sills of which are about upon the same level as the tops of the seat backs 11' and 12. Bed platform supports 11 are anchored to the automobile frame panels that form the window sills as will now more fully appear.

Each support 11 is substantially U-shaped as shown in Fig. 5 but having a short leg 11-a, a somewhat longer leg 11-b and a flat top portion 11-c. The supports 11 are adapted to be hooked over the flanged top 12 of the frame which constitutes the window sill with the short leg 11-a extending rearwardly of the flange 12 and the longer leg 11-b extending downwardly inside of the car in slightly spaced relation with the inner wall 13 of the car. Screws 14 extend through the longer legs of the supports 11 and abut the wall of the car where they are provided with suitable heads 15. By tightening these screws, the supports can be tightly clamped in position by drawing the short legs 11-a tightly against the edges of the flange 12 as is obvious.

In the present instance, four supports 11 are shown upon each side of the car; two at the center window and one at each of the end windows 9 and 10. However, they may be variably spaced as desired and each support 11 may have two anchor screws 14 to provide further stability if desired.

The bed platform is adapted to be sustained upon these supports in a manner that will later be set forth. The platform consists of a plurality of transverse members 16, 17, 18 and 19 which are square or rectangular and hollow and of adjustable telescopic sections. As shown in Fig. 3, the transverse members consist of an inner hollow square section 20 and an outer square section 21 in telescopic relation. These sections may be adjusted to obtain the desired length. A plurality of longitudinally extending rods 22 and 23 are adapted to be secured to these transverse members. These rods 22 and 23 consist of telescopic sections 22-a and 22-b and 23-a and 23-b, as shown in Fig. 1 whereby said rods may be lengthened or shortened.

The longitudinal bars 22 and 23 rest upon the transverse bars 16, 17, 18 and 19 as shown in Fig. 1 and are anchored thereto by means of U-bolts 24 which seat over the longitudinal members and which are fastened at the bottoms of the transverse members. It will be noted that each longitudinal member is anchored to each transverse member by a pair of U-bolts 24 which flank opposite sides of the transverse members as shown in Fig. 4. The lower ends of these U-bolts are threaded and a bridging strip 25 fits over the threaded ends of each pair of bolts upon each side of the transverse member. In other words, the ends of opposite bolts of each pair are connected by bridging strips and wing nuts 26. Thus it will be apparent that each pair of U-bolts 24 are tied together under the transverse members while said U-bolts flank opposite sides of the transverse members. This prevents creeping or longitudinal movement of the U-bolts and maintains the parts in fixed relation.

The ends of the transverse members 16, 17, 18 and 19 are supported upon seats 27 positioned upon the top of the supports 11 as shown in Fig. 3 and they are adapted to be held in place by pin rods 28 which extend through the transverse members, the top of the supports 11 and downwardly inside of the legs 11-b of the supports where they are concealed with the exception of their lower ends.

In some instances, it may be desirable to omit the seats 27 and support the transverse members directly upon the sill flanges 12. In such an event, a pin rod 28' may extend through the sill flange as shown in dotted lines in Fig. 3 and be completely concealed behind the window sill. For this reason, the transverse members are provided with two pin holes 29 and the supports 11 likewise.

In the event that the window sill flange is of a different configuration than shown in Fig. 3 or is somewhat lower as shown in Fig. 6, a filler block 30 of proper shape may be inserted between the flange of the sill and the U-shaped support 11. In such manner the bed platform may be supported at the proper elevation above the automobile seats.

While the bed mattress (not shown) may be directly supported upon the aforedescribed platform, an auxiliary platform 31 may be superposed over the main portion of the main platform. This auxiliary platform consists of a pair of spaced longitudinal rods 32 connected by fabric strips 33 extending transversely across the main platform and between the transverse members 11 thereby preventing any sagging of the mattress between the transverse members. This auxiliary platform is adapted to be superposed over the main platform before the bed mattress is placed thereon. This auxiliary platform can be readily rolled up in compact form for carrying purposes.

It will be appreciated that the main platform due to the telescopic transverse and longitudinal members can be easily expanded or contracted to fit different vehicle bodies. At the same time it can be easily disassembled and the members can be telescoped to their shortest possible length for carrying purposes.

It will further be appreciated that this invention makes it possible to carry and set up a bed in the average passenger car now in use which is often desirable when long trips are made.

I am aware that many changes may be made and various details of construction may be modified so I do not propose limiting the patent granted otherwise than necessitated by the appended claims.

I claim:

1. In an automobile body having windows with sills in opposite side walls thereof together with seats positioned between said windows, a bed structure removably carried within said automobile body and comprising a plurality of bed supports arranged to rest upon the window sills, a bed platform carried upon said bed supports in a position over and above said seats, said supports each comprising a window sill engaging flat strap member for seating upon the upper surface of a window sill and having an upper mounting surface thereon, and said flat strap member having depending positioning means for engaging opposite portions of the body wall below and adjacent the sill to keep said sill engaging flat strap member in position on said sill, and said bed platform having extensions thereon each provided for direct support in superimposed relation upon the upper mounting surface of one of said flat strap members in a position over and above the sill, and means for anchoring said extensions to said strap members in said supported positions upon said upper level surfaces of said strap members and over and above the body sills for vertical alignment with the latter and above the interposed flat strap members respectively.

2. In an automobile having windows with sills at the opposite walls thereof and in combination with a contractable and expandible bed platform having supporting projections thereon, a plurality of supports for said platform each comprising a bracket having one portion thereof adapted for resting upon one sill, and having cooperative members connected with said one portion to hold said portion in proper supported relation upon said sill, said cooperative members comprising a leg insertible over the sill into the window well, and another leg extending downwardly from said one portion along the wall adjacent said sill, and adjustable screw means on said latter leg to engage said wall, each of said supporting projections of said bed platform being seated upon said one portion of a bracket and directly above said sill, and releasable means to connect each of the projections directly with the sill supported portion of the bracket.

3. In an automobile having windows with sills at the opposite walls thereof and in combination with a contractable and expandible bed platform, a plurality of supports for said platform each comprising a bracket having one portion thereof adapted for resting upon one sill, and having cooperative members connected with said one portion to hold said portion in proper supported relation upon said sill, said cooperative members comprising a first leg insertible downwardly into the window well, and a second leg extending downwardly from said one portion along the wall at said sill, and a thumb screw connected with said second leg in a position spaced downwardly and below said sill to engage the adjacent wall whereby to clamp said bracket to the wall and to the sill with said first leg of the bracket reacting against the wall from behind said sill.

4. In an automobile having windows with sills at the opposite walls thereof and in combination with a contractable and expandible bed platform, a plurality of supports for said platform each comprising a bracket having one portion thereof adapted for resting upon one sill, and having cooperative members connected with said one portion to hold said portion in proper supported relation upon said sill, said one portion of said bracket having an aperture therein, said bed platform having apertures in the peripheral portions thereof with each of said apertures being disposed adjacent each of said brackets, and loose headed pins for connecting said bed platform and said brackets by free gravity insertion of each of said pins through one of the bed platform apertures and through a corresponding registering aperture in an adjacent bracket respectively.

References Cited in the file of this patent

UNITED STATES PATENTS

| Number | Name | Date |
|---|---|---|
| 1,080,577 | Pascale et al. | Dec. 9, 1913 |
| 1,487,984 | Strain | Mar. 25, 1924 |
| 1,545,104 | Keith | July 7, 1925 |
| 1,631,620 | Carrigan | June 7, 1927 |
| 1,676,987 | Line | July 10, 1928 |
| 1,867,276 | McIntyre | July 12, 1932 |
| 1,943,648 | Wessman | Jan. 16, 1934 |
| 2,531,096 | Allers | Nov. 21, 1950 |
| 2,564,480 | Jones | Aug. 14, 1951 |

FOREIGN PATENTS

| Number | Country | Date |
|---|---|---|
| 30,318 | Australia | Nov. 19, 1931 |